No. 637,298. Patented Nov. 21, 1899.
G. S. STRONG.
GAS ENGINE.
(Application filed Dec. 15, 1898.)
(No Model.) 10 Sheets—Sheet 1.

Witnesses:
Inventor:
George S. Strong
by his atty.

No. 637,298. Patented Nov. 21, 1899.
G. S. STRONG.
GAS ENGINE.
(Application filed Dec. 15, 1898.)
(No Model.) 10 Sheets—Sheet 2.

Witnesses: Inventor:
George S. Strong

No. 637,298. Patented Nov. 21, 1899.
G. S. STRONG.
GAS ENGINE.
(Application filed Dec. 15, 1898.)

(No Model.) 10 Sheets—Sheet 3.

No. 637,298. Patented Nov. 21, 1899.
G. S. STRONG.
GAS ENGINE.
(Application filed Dec. 15, 1898.)
(No Model.) 10 Sheets—Sheet 5.

Witnesses:
Henry Drury
D. Stewart

Inventor:
George S. Strong
by his atty.
Francis T. Chambers

No. 637,298. Patented Nov. 21, 1899.
G. S. STRONG.
GAS ENGINE.
(Application filed Dec. 15, 1898.)
(No Model.) 10 Sheets—Sheet 6.

Witnesses: Inventor:
George S. Strong
by his atty.

THE NORRIS PETERS CO., PHOTO-LITHO., WASHINGTON, D. C.

No. 637,298. Patented Nov. 21, 1899.
G. S. STRONG.
GAS ENGINE.
(Application filed Dec. 15, 1898.)

(No Model.) 10 Sheets—Sheet 7.

Witnesses: Inventor:
George S. Strong
by his atty.

No. 637,298. Patented Nov. 21, 1899.
G. S. STRONG.
GAS ENGINE.
(Application filed Dec. 15, 1898.)
(No Model.) 10 Sheets—Sheet 8

Witnesses:
Henry Drury

Inventor:
George S. Strong
by his atty.
Francis T. Chambers

No. 637,298. Patented Nov. 21, 1899.
G. S. STRONG.
GAS ENGINE.
(Application filed Dec. 15, 1898.)
(No Model.) 10 Sheets—Sheet 9.

Witnesses: Inventor:
George S. Strong
by his atty.
Francis T. Chambers

UNITED STATES PATENT OFFICE.

GEORGE S. STRONG, OF NEW YORK, N. Y., ASSIGNOR TO JOHN P. MURPHY, OF PHILADELPHIA, PENNSYLVANIA.

GAS-ENGINE.

SPECIFICATION forming part of Letters Patent No. 637,298, dated November 21, 1899.

Application filed December 15, 1898. Serial No. 699,312. (No model.)

*To all whom it may concern:*

Be it known that I, GEORGE S. STRONG, a citizen of the United States of America, residing in the city and county of New York, in the State of New York, have invented certain new and useful Improvements in Gas-Engines, of which the following is a true and exact description, reference being had to the accompanying drawings, which form a part thereof.

My invention relates to the construction of gas-engines, and has for its object the general improvement of engines of this kind, the leading feature of my invention consisting in a novel combination of a four-cylinder engine with a two-crank shaft, whereby an explosion takes place for each half-revolution of the shaft.

Another feature of my invention consists in a novel valve or valve-and-igniter mechanism characterized by great simplicity and applicable with advantage to two-cylinder engines, although especially adapted for the four-cylinder type.

Still another feature of my invention consists in a novel device for governing the action of the admission-valves.

I have also in the development of my engine made improvements in the starting mechanism, in the igniting mechanism, and in the construction and combination of the shaft, fly-wheel, and shaft-bearing, which improvements though illustrated in my drawings form the subject-matter of other divisional applications, and I have also improved certain details, as will be hereinafter pointed out in the description and claims.

Reference being now had to the drawings, in which my invention is illustrated.

Figures 1, 2:
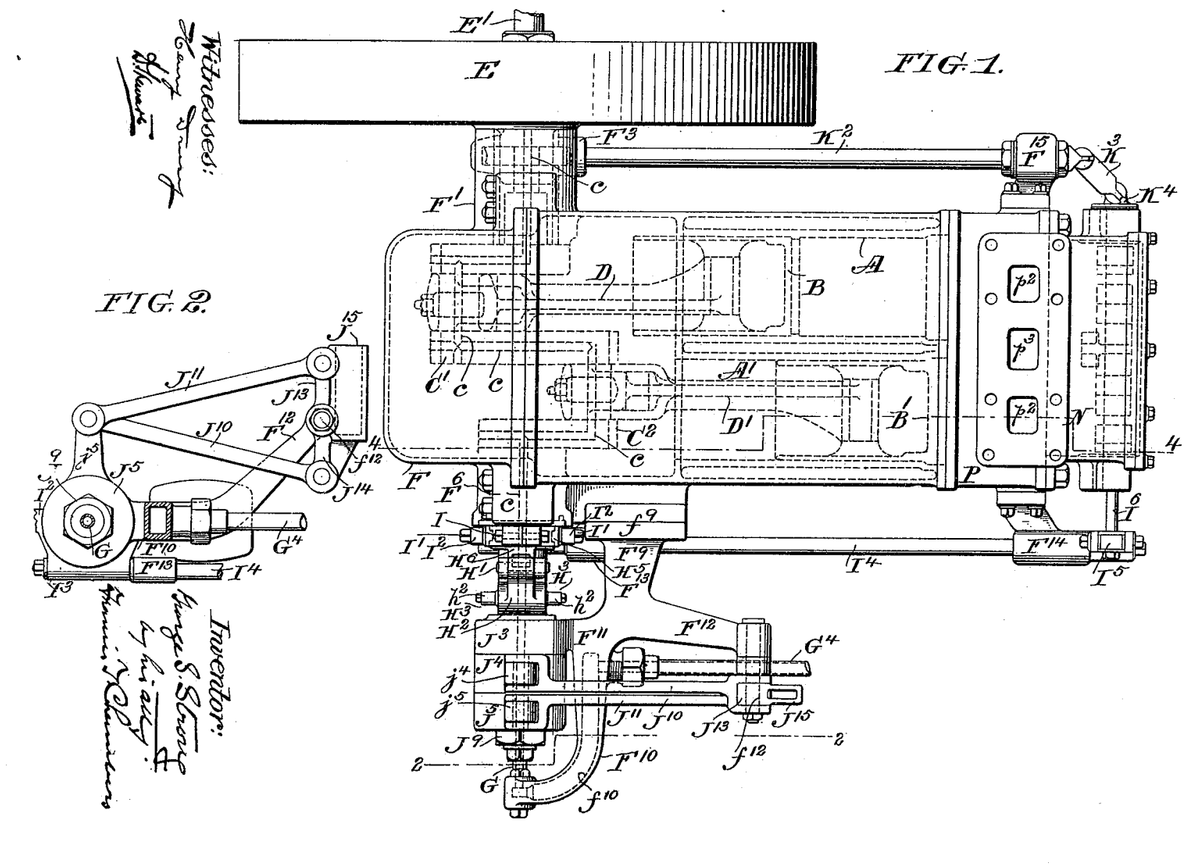
Figure 1 is a plan view of my engine as especially designed for use in automobile-vehicles.
Fig. 2 is a side view of the starting mechanism.

A, A', A$^2$, and A$^3$ are the four cylinders of my gas-engine, which may be conveniently formed in a single casting, as shown, and which may be surrounded with water-jackets. The cylinders A and A$^2$ are indicated in Fig. 1 and the cylinders A' and A$^3$ in Fig. 4, and it will be understood that the cylinder A$^2$ lies back of the cylinder A just as the cylinder A$^3$ lies back of the cylinder A'.

B, B', B$^2$, and B$^3$ are the pistons working in the four cylinders.

C is the crank-shaft of the engine, having formed upon it two cranks, (indicated at C' and C$^2$,) arranged opposite—say at one hundred and eighty degrees—one to the other. Pivotally connected with the pistons B, B', B$^2$, and B$^3$ are the connecting-rods D, D', D$^2$, and D$^3$, of which the rods D' and D are connected directly to the shafts C$^2$ and C', respectively, while the rods D$^3$ and D$^2$ are pivotally connected with the rods D' and D, respectively, the connections being as shown at D$^5$ and D$^4$, Fig. 4, and it will be obvious that owing to this construction the pistons B' and B$^3$ will move always together and in the same direction, while the pistons B and B² will also move together in the opposite direction to the first-mentioned couple.

Figure 5:
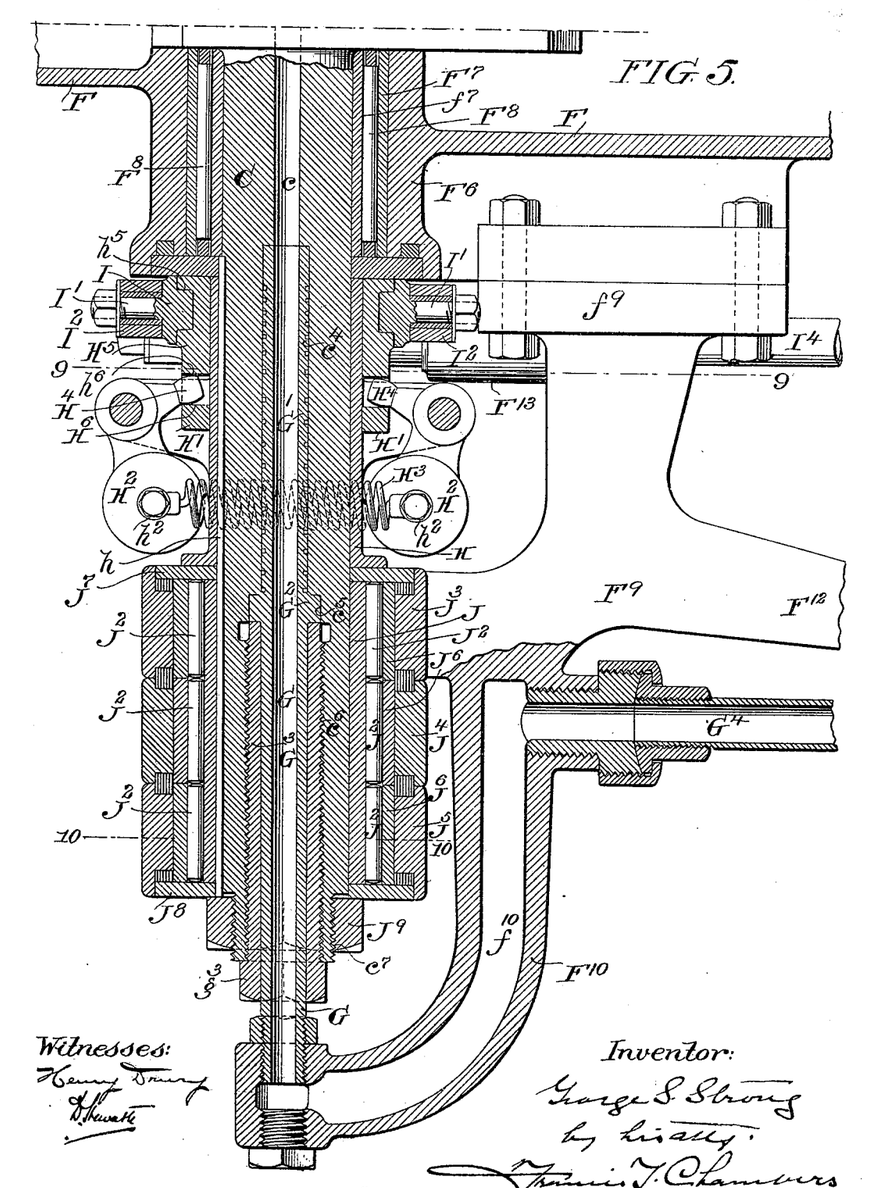
Fig. 5 is a sectional view of one end of the shaft and the appliances connected therewith.
Figure 6:
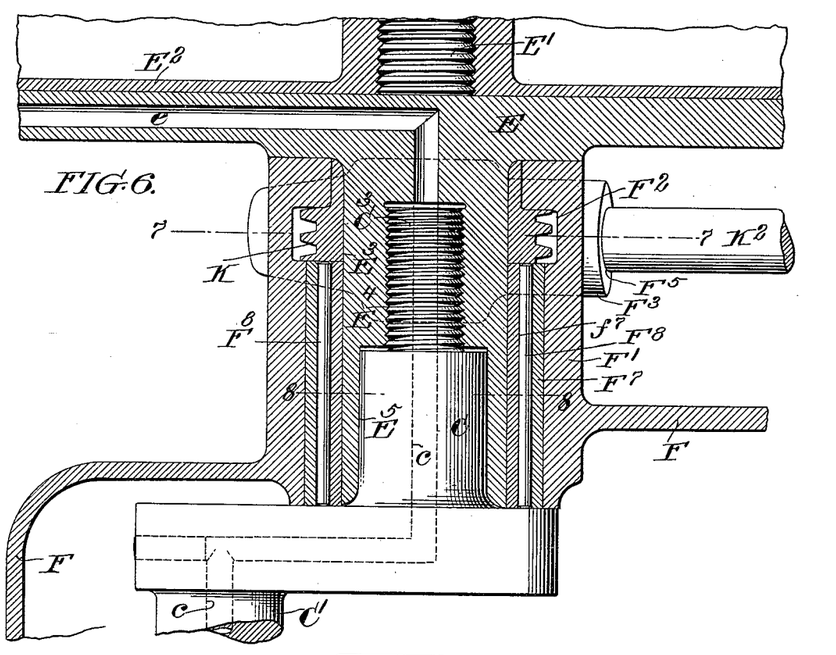
Fig. 6 is a similar sectional view of the other end of the shaft.

E indicates the fly-wheel of the engine, which I have shown as constructed in accordance with another invention, for which I have filed application for Letters Patent, Serial No. 698,623, dated December 8, 1898—that is to say, as provided with a transversely-moving plunger E², Fig. 6, carrying a crank-pin E' and moving in a cylinder formed in the fly-wheel, to which leads a channel $e$, which at the center of the wheel communicates, as shown in Fig. 6, with a channel $c$, formed through the crank-shaft and cranks, and connecting at the other end of the shaft, as shown in Fig. 5, through a tube G with a hollow bracket $F^{10}$ $f^{10}$, indicating the passage in said bracket—and $G^4$ the pipe by which pressure fluid is induced and exhausted from the fly-wheel. Referring still to Fig. 5, it will be seen that the channel $c$ is enlarged, as indicated at $c^4$, and still further enlarged, as indicated at $c^5$, the outer portion of this enlargement being threaded, as indicated at $c^6$, while the outer end of the shaft is continued as a threaded projection $c^7$. The tube G, which screws at one end into the head of the bracket $F^{10}$, has a portion G', which fits in the cylindrical enlargement $c^4$, formed, as shown, with a multiplicity of annular grooves, which serve the function of and take the place of packing in preventing leakage. The tube is also formed with a shoulder $G^2$, which regulates its entrance into the hollow shaft, and is held in place in the shaft by a long hollow screw $G^3$, screwing into the portion $c^6$ and having the head $g^3$. This last-described construction is also a portion of the subject-matter of my said former case and need not be further referred to.

Returning to the shaft end, which is connected with the fly-wheel and which is best illustrated in Fig. 6, it will be noticed that the fly-wheel E is formed with a central projecting stud-shaft $E^3$, having near the wheel a threaded perforation $E^4$, which near the outer end of the said shaft opens into an enlarged unthreaded perforation $E^5$. It will also be noticed that the end of the shaft C enters the portion $E^5$, fitting therein, and is provided with a threaded extension $C^3$, which screws into the threaded perforation $E^4$, thus uniting the fly-wheel and shaft securely together.

F is the casing, thrown around the cranks and the end of the cylinders and in which the bearings for the crank-shaft are formed; but the bearing F' (shown in Fig. 6) I make so as to be directly a bearing for the stud-shaft $E^3$ of the fly-wheel and only through this stud-shaft a bearing for the end of the crank-shaft. In this way I carry the weight of the fly-wheel directly on the bearing instead of making the bearing act directly upon the end of the shaft and carrying the weight of the fly-wheel on the shaft. As shown, I form in the bearing F' an annular chamber $F^2$, which communicates with a shaft-starting extension $F^3$, having formed in it a chamber $F^4$ for a screw-geared wheel and a bearing $F^5$, through which the shaft passes to enter and be united with the said wheel. As above described, this construction forms the subject-matter of my divisional application, Serial No. 715,695, filed May 5, 1899.

Figures 7, 8:
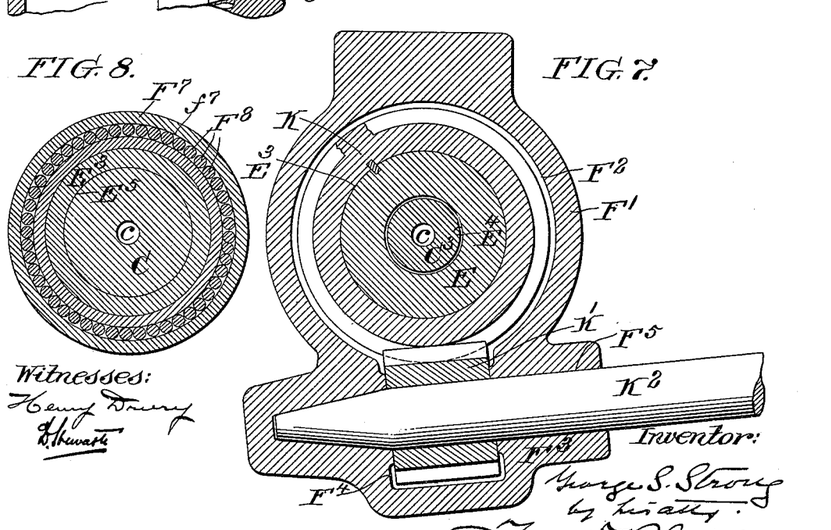
Fig. 7 is a cross-section on the line 7 7 of Fig. 6.
Fig. 8 is a cross-section on the line 8 8 of Fig. 6.

K is a worm-wheel secured directly on the stud-shaft $E^3$, and K' an engaged worm-wheel secured on a shaft $K^2$, which is rotated by the rotation of the stud-shaft $E^3$ and which by a universal joint, as indicated at $K^3$, Fig. 1, or by any other convenient mechanism communicates rotary motion to the cam-shaft $K^4$, to be hereinafter described. The upper bearing for the shaft $K^2$ is indicated at $F^{15}$, Fig. 1. The bearing $F^6$, (see Figs. 1 and 5,) like the bearing F', is preferably made as shown in Figs. 5, 6, and 8—that is to say, the bearing in the casing is provided with a liner $F^7$ and the shaft or stud-shaft, as the case may be, provided with a similar liner $f^7$, while a nest of rollers $F^8$ is placed between these liners, making the bearings both of the kind known as "roller-bearings."

Figure 3:
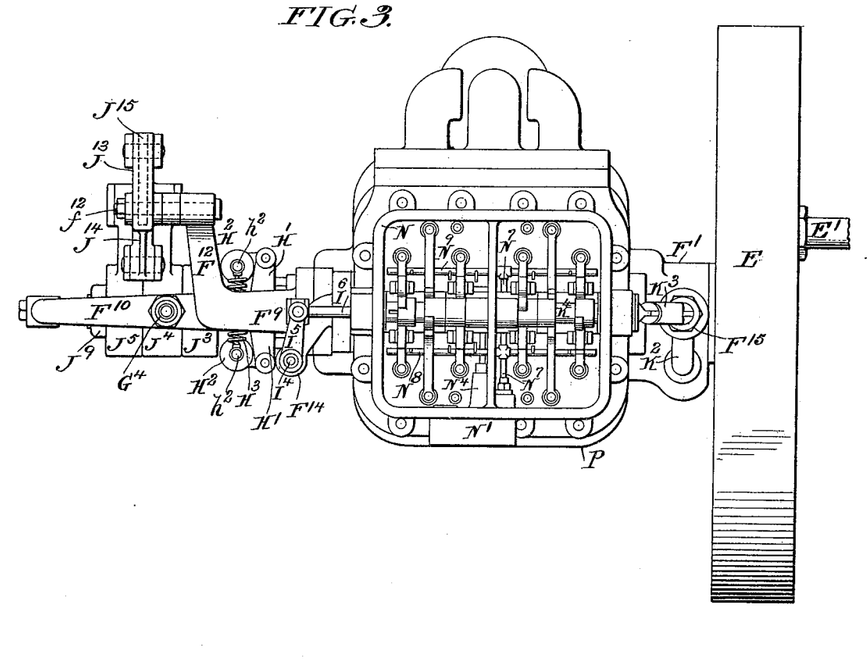
Fig. 3 is an end view of the engine.

I have already referred to the bracket $F^{10}$ and will here call attention to the fact that it is, as shown in Figs. 1, 3, and 5, an arm of a branch $F^9$, secured to the casing F by means of a flange $f^9$ and having in addition to the arm $F^{10}$ an arm $F^{11}$, in which is formed or to which is secured a clutch-ring $J^3$, and another arm $F^{12}$, which supports mechanism used in starting the machine, and while still speaking of the casing of the machine I will call attention to the shaft-bearings $F^{15}$ and $F^{14}$, (see Figs. 1, 3, and 5,) which support the governor-actuated shaft $I^4$.

Figure 9:
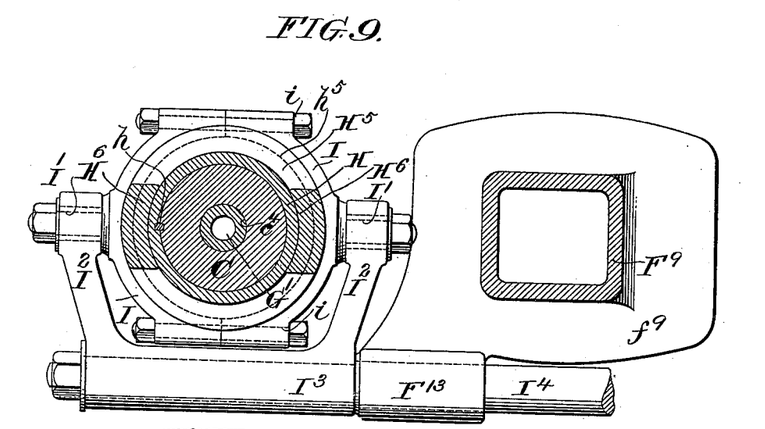
Fig. 9 is a cross-section on the line 9 9 of Fig. 5.
Figures 17, 18, 19, 22, 23:
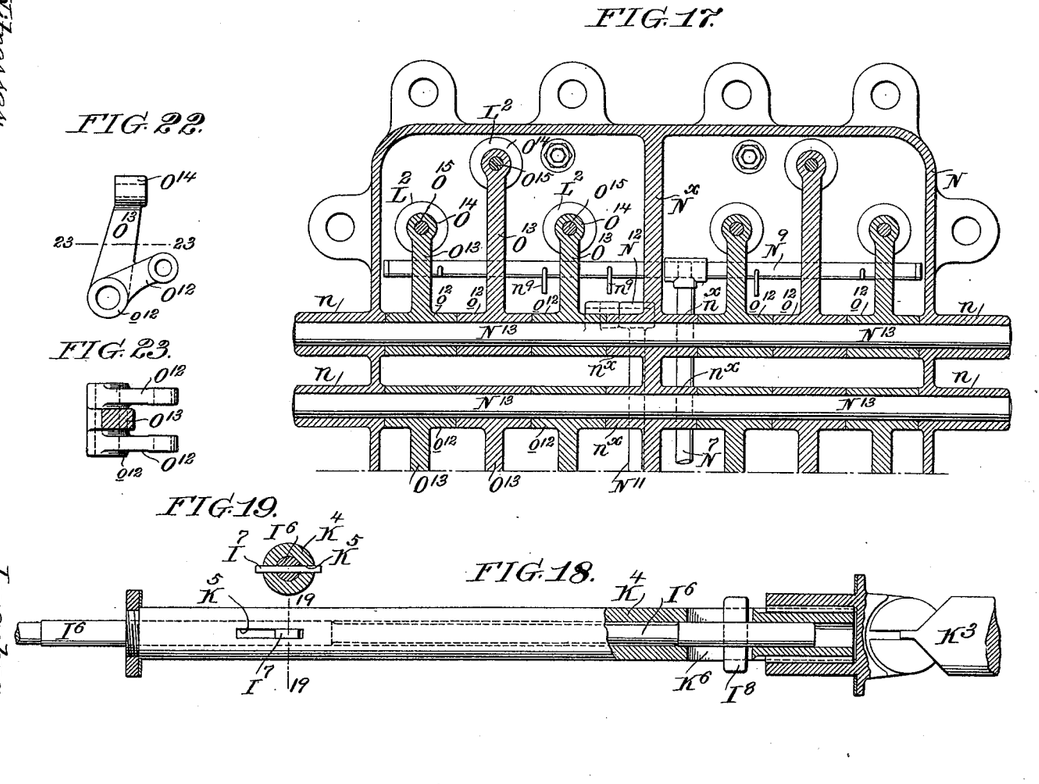
Fig. 17 is a cross-section on the line 17 17 of Fig. 16.
Fig. 18 is a view, on an enlarged scale, of the cam-actuating shaft and governing-rod.
Fig. 19, a cross-section on the line 19 19 of Fig. 18.
Fig. 22 is a side view of one of the valve-actuating levers, such as are used for actuating the admission and exhaust valves.
Fig. 23, a cross-section on the line 23 23 of Fig. 22, and Figs. 24 and 25 are side elevations of the cam-actuating levers used in operating the igniters.

Referring now to the governor, (see Figs. 1, 3, and 5,) H is a sleeve secured to the shaft C as by means of a key $h$ (see Fig. 5) and having upon it projecting arms H' H', arranged in two pairs and serving to support the pivots of the governor-weights $H^2$ $H^2$, which are, as shown, provided with laterally-extending lugs $h^2$, to which springs $H^3$ $H^3$ are connected, tending to draw the weights down into contact with the sleeve H. The weight-levers of the governor are formed with extensions $H^4$ $H^4$, which lie in slots $h^6$ of arms $H^6$, extending out from a grooved ring $H^5$, supported on the sleeve H, the groove being indicated at $h^5$. An annular ring I is secured in the groove $h^5$ and provided with trunnion-like pins I' I', to which are pivotally connected the arms $I^2$ $I^2$, extending from a hub $I^3$, (see Fig. 9,) which is attached to the bottom of a shaft $I^4$, which, extending up through the bearings $F^{13}$ and $F^{14}$, (see Fig. 1,) has attached to its upper end a lever-arm $I^5$, (see Figs. 1 and 3,) which in turn is connected to the end of a rod $I^6$, which extends through a central perforation in the cam-shaft $K^4$, as is best shown in Fig. 18, in which view it will be seen that the shaft $K^4$ besides being centrally perforated is formed with slots $K^5$ and $K^6$, through which extend keys $I^7$ and $I^8$, secured to the rod $I^6$, and to which in turn are secured the admission-cams $m$ and $m'$, or rather the hubs M and M', on which these cams are formed. The connection of the rod $I^6$ with the lever $I^5$ is of course by means of a joint which permits the rod to rotate in the lever, as it will be understood that the key connection of said rod with the shaft $K^4$ is such as requires the two to rotate together.

Figure 15:
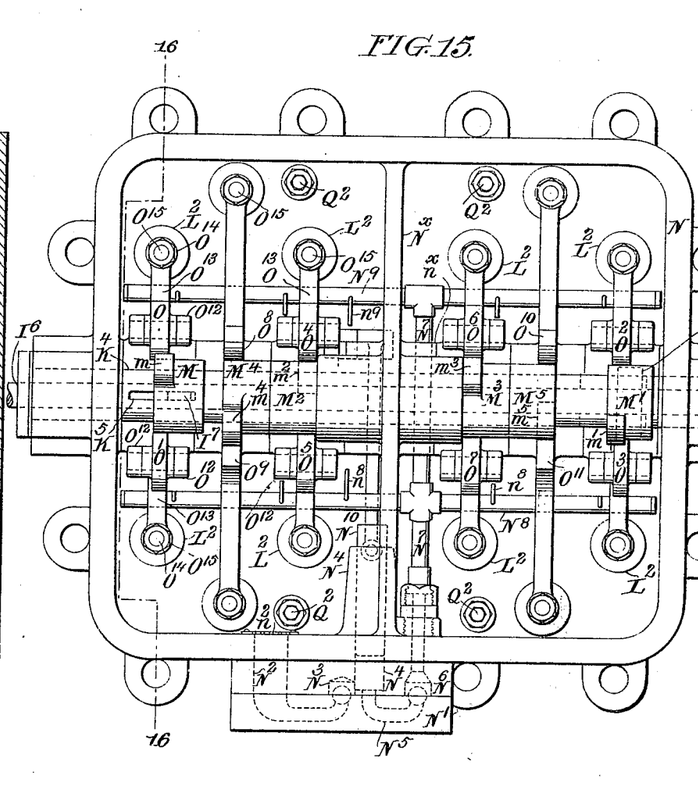
Fig. 15 is a view of the valve-actuating cam-box with its top or lid removed.
Figure 16:
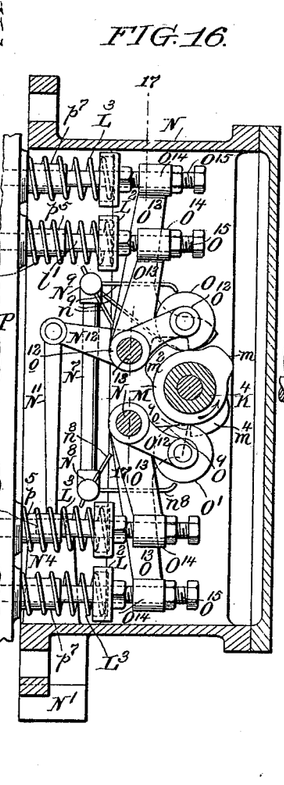
Fig. 16 is a cross-section through this box on the line 16 16 of Fig. 15.

For the four-cylinder engine, as shown in the drawings, I employ two cams to operate the four admission-valves, two other cams to actuate the four exhaust-valves, and two other cams to actuate the igniters, each acting alternately on the valves and igniters of two cylinders, the pistons of which are coupled to move as one. The admission-cams are, as already stated, secured directly to the keys $I^7$ and $I^8$, so that besides rotating with the shaft $K^4$ they move longitudinally along with this shaft in a direction to an extent determined by the position of the shaft-governor. The cams actuating the exhaust-valves are indicated at $m^3$ and $m^2$. (See Figs. 15, 16, 20, and 21.) Their hubs $M^3$ and $M^2$ are secured directly to the shaft $K^4$, as are also the cams $m^4$ and $m^5$, the hubs of which $M^4$ and $M^5$ are also directly attached to the shaft. The cam-shaft passes through a box N, in which are situated bearing-rods $N^{13} N^{13}$, &c., as shown in Fig. 17, said rods being supported in studs $n n^\times$, the latter of which extends from a central web $N^\times$ in the box N and serving to support the hubs $o^{12} o^{12}$, &c., of a series of twelve valve-actuating lever-arms $O^{13}$, arranged in pairs and extending in opposite directions on each side of the shaft $K^4$. The levers $O^{13}$ appertaining to the admission and exhaust valves are formed, as best shown in Figs. 22 and 23, with perforated heads $O^{14}$ at their outer ends and with upwardly-extending arms $O^{12}$, connected with the hub and adapted to support cam-rollers, as shown in Figs. 15 and 16, O and O' indicating the cam-rollers acted on by the admission-cam $m$, $O^2$ and $O^3$ the rollers acted on by the admission-cam $m'$, $O^4$ and $O^5$ the rollers acted on by the exhaust-cam $m^3$, and $O^6$ and $O^7$ the rollers acted on by the exhaust-cam $m^2$, and I would here call attention to the fact that I have shown the admission-cam rollers O' and $O^3$ as formed and arranged so that as the cams $m$ and $m'$ move toward the right in Fig. 15 they will move out of the path of these rollers before they move out of the path of the rollers O and $O^2$. In this way the first effect of the governor when the engine is unduly speeded is to cut off the admission to all of the cylinders, reducing the explosions to one for each complete revolution of the shaft, and then if the speed still exceeds the normal the cams will clear the rollers O and $O^2$, in which case no explosive-gas is admitted to any of the four cylinders.

Figure 20:
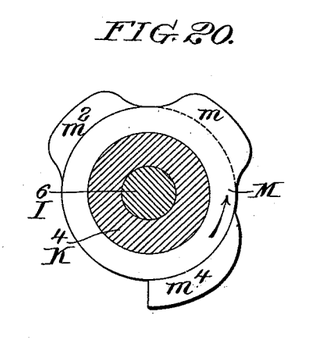
Figs. 20 and 21 are views showing the form and disposition of the six cams used in my engine to actuate the admission and exhaust valves and the igniters.
Figure 21:
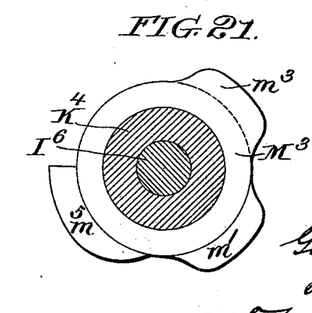
Figure 24:
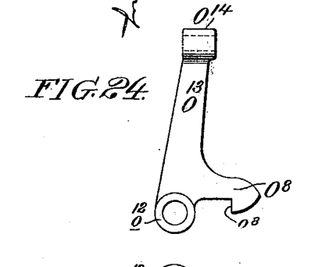
Figure 25:
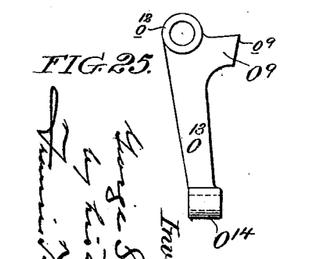

Referring next to the levers used in connection with the igniters, it will be noticed in Figs. 20 and 21 that the igniter-cams $m^4$ and $m^5$ are formed with abrupt rear shoulders and in Figs. 24 and 25 that the valve-actuating levers $O^{13}$ are on one side of the cam-shaft provided with upwardly-extending arms, as $O^8$, having a downwardly-looking abrupt shoulder $o^8$, while on the other side of the cam-shaft the upwardly-extending arm $O^9$ is made with an upwardly-abrupt shoulder $o^9$. It will thus be seen that the cam-roller revolved to the right will after depressing the levers $O^{13}$ successively suddenly leave contact, permitting the lever to snap back under the impulse of the springs, which are arranged to act upon them.

I have already mentioned the perforated hub-like ends $O^{14}$ of the valve and igniter actuating levers. These perforated hubs are threaded and in the screw-adjusting screws $O^{15}$, (best shown in Fig. 16,) said screws resting on the top of valve-spindles to be hereinafter described.

Of course any construction of valve may be adapted for use with my valve-actuating cams and governing device, and before describing the specific construction of the valve shown in the drawings I will pass to other parts of the machine, the above description being sufficient to indicate the action of the governor, which is the main point to which I have heretofore referred to in these parts.

Figure 10:
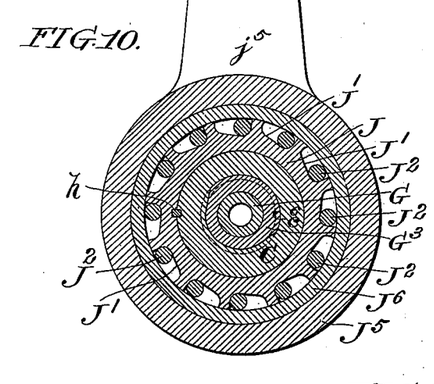
Fig. 10 is a cross-section on the line 10 10 of Fig. 5.
Figure 11:
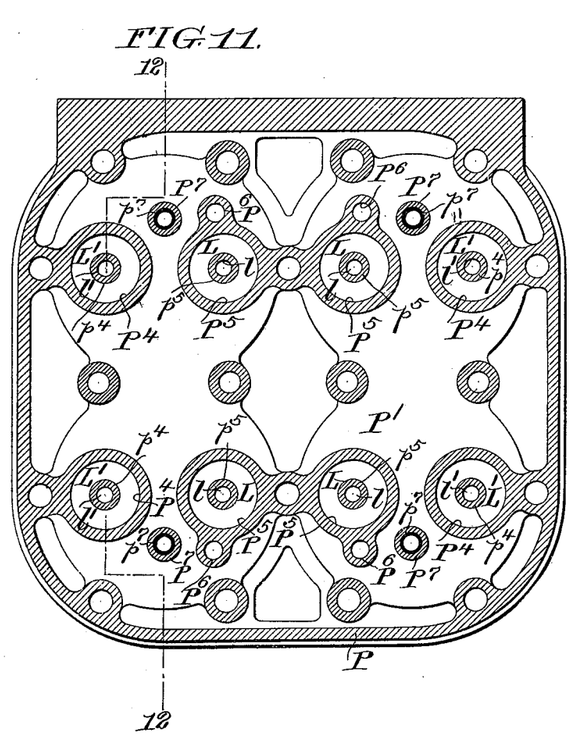
Fig. 11 is a view of the engine-head casting, taken on the section-line 11 11 of Fig. 12.
Figure 12:
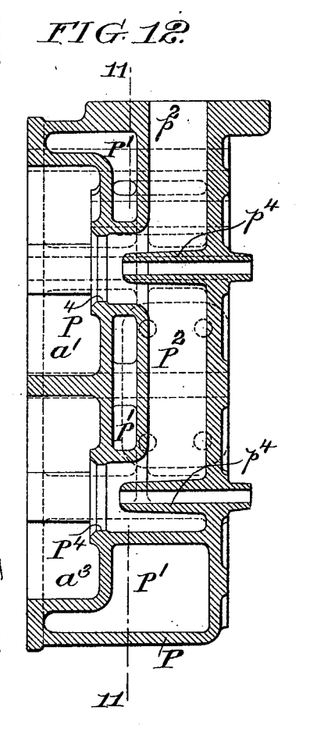
Fig. 12, a view of the same casting, taken on the line 12 12 of Fig. 11.
Figure 13:
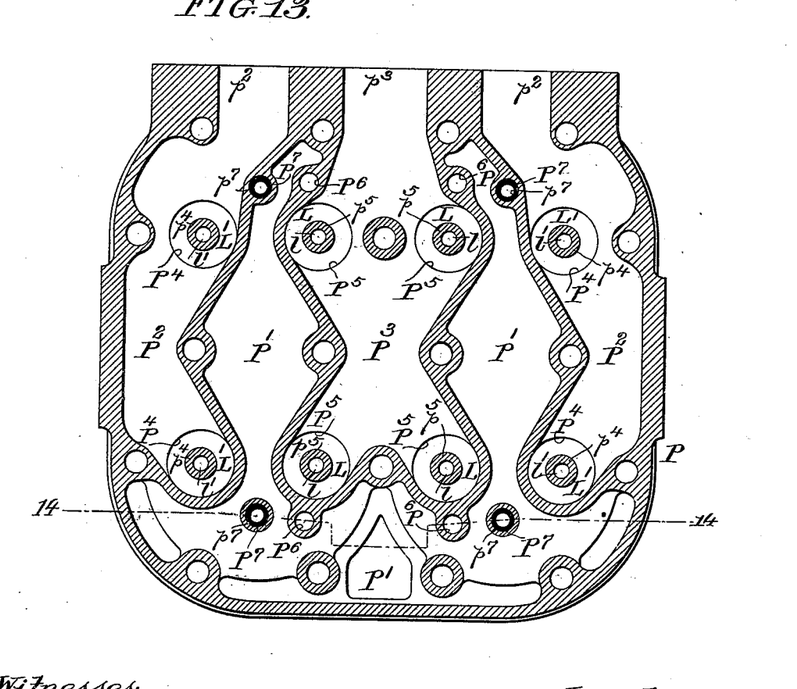
Fig. 13, a view of the same casting, taken on the line 13 13 of Fig. 14.

Referring now again to Figs. 1, 2, 3, 5, and 10, J is a clutch-drum secured on the shaft C and formed, as shown in Fig. 10, with a multiple series of roller-chambers J', in which are situated rollers $J^2 J^2$, &c. Surrounding this clutch-drum are three hard-metal rings $J^6 J^6$, &c., one connected with a stationary clutch-ring $J^3$, which, as already stated, is formed in or secured to the arm $F^{11}$ of the bracket $F^9$, while the other two rings are secured to the angularly-movable clutch-rings $J^4$ and $J^5$, and it will be understood that, as clearly shown in Fig. 5, a separate set of rollers $J^2$ is provided for each clutch-ring. From the rings $J^4$ and $J^5$ extend lever-arms $j^4$ and $j^5$, to which in turn are secured connecting-rods $J^{10}$ and $J^{11}$, one connected on each end of the central pivoted lever $J^{13} J^{14}$, pivoted on the arm $F^{12}$ at $f^{12}$ and provided with a socket $J^{15}$, adapted to receive the end of the lever. The function of the clutch-ring $J^3$ is at all times to prevent a revolution of the shaft in a backward direction, while leaving it entirely free to move forward, and the function of the clutches $J^4$ and $J^5$ is to move the shaft in a forward direction, the actuating mechanism being of a pump-like action and the two clutches acting alternately on the shaft. This mechanism also forms the subject-matter of a divisional application—to wit, Serial No. 715,696, filed May 5, 1899.

P is the cylinder-head casting of the engine. (Shown in detail in Figs. 1, 4, 11, 12, 13, and 14.) It is formed with four head portions $a$, $a'$, $a^2$, and $a^3$, fitting over the corresponding cylinders A A', &c. Over and around these cylinder-head portions the casting is chambered to form a water-chamber P', and over the water-chamber P' the casting is divided into three chambers $P^2$, $P^2$, and $P^3$, of which, in the construction, $P^2$ $P^2$ are admission-chambers, and $P^3$ an exhaust-chamber. The form of these chambers is determined largely by the symmetrical and convenient disposition of the valves, and they are formed, as shown, with extensions of the water-chamber P' between and partly around them. (See Fig. 1.) The ports through which the explosive mixture is introduced are indicated at $p^2$ $p^2$, and the port through which the burned gases are expelled is indicated at $p^3$.

Figure 4:
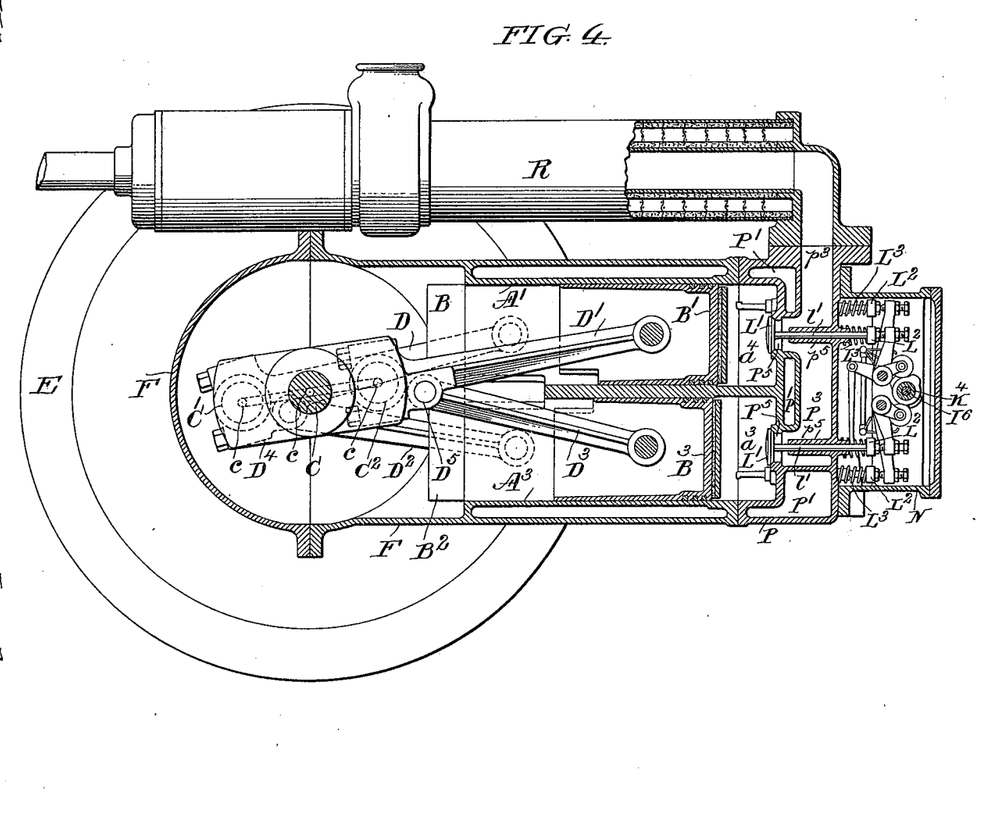
Fig. 4 is a side elevation of the engine on an irregular section-line, the general direction of which is indicated at 4 4, Fig. 1.

The device indicated at R in Fig. 4 as connected with the exhaust-port forms the subject-matter of my other application, filed December 24, 1898, and serially numbered 700,277, and need not be further described.

Admission-ports $P^4$ (two in each chamber $P^2$) extend from such chambers in tubular form through the water-chamber into each of the four cylinders, and I also form through the entire head-casting four pairs of tubular passages, (indicated at $P^6$ and $P^7$,) one pair leading into each cylinder and serving for the installation and operation of the electrical igniter, to be described.

$p^4$ and $p^5$ (best shown in Fig. 12) are tubular bearings for the admission and exhaust valve stems, and they are preferably made to extend both above and below the top of the casting, as shown, the upper extension serving particularly to hold in place a spring.

L L, &c., indicate the exhaust-valves, having stems $l$, while L' L', &c., indicate the admission-valves, having stems $l'$. To the top of each stem is secured, as best shown in Fig. 16, a flanged cap $L^2$, beneath which and the top of the head-casting P is a spring $L^3$, acting to normally keep the valve seated. The ends of the valve-rods are situated in the cam-chamber N, which has already been described, and their disposition is such as to bring one of them beneath the end of each of the levers $O^{13}$, an adjusting-screw $O^{15}$ screwing into the heads $O^{14}$ of said levers, so as to impinge directly on the end of the valve-stem when the said lever is depressed by its actuating-cam.

Figure 14:
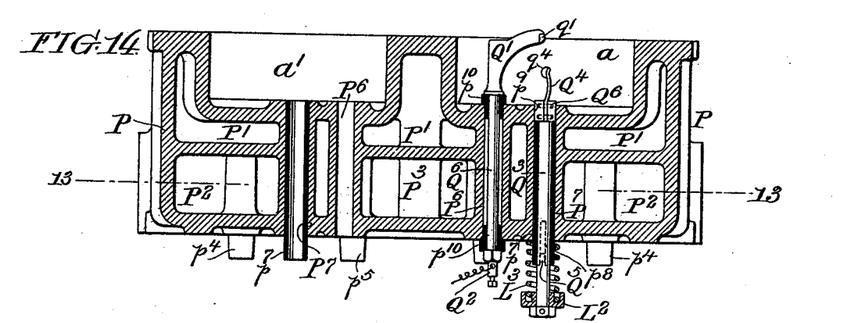
Fig. 14 is a view of the same casting taken on line 14 14 of Fig. 13.

The construction of the igniter, which forms the subject-matter of another divisional application—viz., Serial No. 715,697, filed May 5, 1899—is shown in Fig. 14 of the drawings, and, as there represented, a conducting-rod Q extends through the perforation $P^6$, being insulated therefrom by non-conducting thimbles, (indicated at $p^{10}$ $p^{10}$.) The end of the conducting-rod Q which extends into the cylinder is provided with a curved extension Q', having a contact-point $q'$, and the other end of the rod Q, which extends into the chamber N, is connected with one pole of a battery. The tubular passage $P^7$ is, as shown, fitted with a liner $p^7$, which projects up into the chamber N, but does not quite reach the cylinder, leaving a cylindrical portion $P^9$ between the end of the liner $P^7$ and the head of the cylinder. This liner is, as shown, provided with a slot or slots $p^8$. Fitting in the liner $p^7$ is a rod $Q^3$, having secured to it a key $Q^5$, which fits in the slot or slots $p^8$, and whereby the rod is prevented from turning, and having secured to its inner end an elastic finger $Q^4$, having a contact-point $q^4$, so arranged as to come in contact with the point $q'$ when the rod $Q^3$ is thrust inward. Also secured to the end of the rod $Q^3$ is a piston-like extension $Q^6$, which fits in the cylindrical end $p^9$. The end of the rod $Q^3$ which extends into the cam-chamber is, like the valve-rods, provided with a head $L^2$ and a spring $L^3$, which holds the rod $Q^3$ and its connections normally in the position shown in Fig. 14. When, however, the igniter-lever is actuated by its proper cam, the rod $Q^3$ is forced inward, the piston $Q^6$ leaving the cylinder $q^9$ and the two contact-points $q^4$ and $q^8$ being brought together. As soon as the igniter-actuating cam leaves contact with the lever-arm upon which it operates, and which, it will be recollected, is shaped so that the contact is broken suddenly, the rod $Q^3$ is instantly retracted, with the effect of forming a spark between the two contact-points, while a noisy and injurious blow is prevented by the entry of the piston $Q^6$ into the cylinder $p^9$ and the compression of whatever gas is imprisoned in said cylinder.

Having now described my invention, what I claim as new, and desire to secure by Letters Patent, is—

1. A gas-engine having four cylinders arranged side by side in pairs lying in planes at right angles to the shaft and said pairs again arranged side by side so that the cylinders lie within the corners of an approximate square, in combination with pistons working in each cylinder, a shaft having oppositely-disposed cranks one lying opposite to each pair of cylinders, means coupling the pistons of each pair of cylinders to the crank lying opposite to said pair so that said pistons move in and out together, admission and exhaust valves leading to and from each cylinder, means for operating the admission and exhaust valves of each pair of cylinders as described so that explosions occur alternately in each cylinder of each pair and an impulse is given to the shaft at each half-revolution.

2. A gas-engine having four cylinders arranged side by side in pairs lying in planes at right angles to the shaft and said pairs again arranged side by side so that the cylinders lie within the corners of an approximate square, in combination with pistons working in each cylinder, a shaft having oppositely-disposed cranks one lying opposite to each pair of cylinders, means coupling the pistons of each pair of cylinders to the crank lying opposite to said pair so that said pistons move in and out together, admission and exhaust valves leading to and from each cylinder, a single rotating cam-shaft extending across the head of the engine-cylinders as described, rotating cams secured on said shaft one for the admission and one for the exhaust valve of each pair of cylinders, and valve-actuating levers for each valve said levers being arranged in pairs and to be engaged and operated successively by the cams as described.

3. A gas-engine having in combination two cylinders arranged side by side on one side of the shaft, two pistons working therein and coupled to a single crank, admission and exhaust valves leading into each cylinder, a hollow rotating cam-shaft having a transverse slot, as $K^5$, formed therein, a rod $I^6$ longitudinally movable in the cam-shaft and having a key as $I^7$ extending from it through slot $K^5$, a governor arranged to shift the longitudinal position of rod $I^6$, a rotating admission-cam as $M\ m$ secured on the cam-shaft and to the key $I^7$, a rotating exhaust-cam secured fixedly on the cam-shaft and valve-actuating levers, one for each valve and each pair arranged to be engaged and actuated successively by one of the cams except when the admission-cam is shifted by the governor.

4. A gas-engine having four cylinders arranged side by side on one side of the shaft and four pistons working therein and coupled in pairs to two oppositely-lying cranks on the shaft, admission and exhaust valves leading to and from each cylinder, a rotating cam-shaft extending across the head of the engine-cylinders as described, two exhaust-valve cams secured on said shaft, two admission-valve cams rotating with but longitudinally movable on said shaft, a governor and connections therefrom to regulate the longitudinal shifting of the admission-cams, two pairs of exhaust-valve-actuating levers each pair being arranged to be operated alternately by a rotating cam and two pairs of admission-valve-actuating levers each pair being arranged to be alternately actuated by one of the governor-controlled cams.

5. A gas-engine having four cylinders arranged side by side on one side of the shaft and four pistons working therein and coupled in pairs to two oppositely-lying cranks on the shafts, admission and exhaust valves leading to and from each cylinder, a rotating cam-shaft extending across the head of the engine-cylinders as described, two exhaust-valve cams secured on said shaft, two admission-valve cams rotating with but longitudinally movable on said shaft, a governor and connections therefrom to regulate the longitudinal shifting of the admission-cams, two pairs of exhaust-valve-actuating levers each pair being arranged to be operated alternately by a rotating cam and two pairs of admission-valve-actuating levers, each pair being arranged to be alternately actuated by one of the governor-controlled cams and one lever of each pair having its cam-contacting end arranged to remain in the path of the shifting cam after the cam-contacting end of the other has moved out of said path.

6. A gas-engine having two cylinders arranged side by side on one side of the shaft and two pistons arranged to move together, admission and exhaust valves and an igniter for each cylinder, in combination with a rotating cam-shaft having secured thereon three cams the one, as $M^4\ m^4$, operating the igniters having an abrupt rear shoulder two pairs of valve-actuating levers one for the admission and the other for the exhaust valves and each pair being arranged to be actuated alternately by a single cam, and a pair of igniter-actuating levers arranged to be actuated alternately by the igniter-cam and having their cam-contacting ends abruptly shouldered as described and so as to snap back when having contact with the rear shoulder of cam $M^4\ m^4$.

7. In combination with a four-cylinder gas-engine substantially as described, a cylinder-head casting K having a water-chamber $K'$ adapted to come immediately over the heads of the cylinders and to communicate with the water-jacket surrounding the cylinders, said casting having formed in it also two lateral chambers $K^2\ K^2$ and a central chamber $K^3$ and valve-ports $K^4$ and $K^5$ leading from said chambers through the water-chamber $K'$ and through the cylinder-heads as described.

8. In combination with a four-cylinder gas-engine, substantially as described, a cylinder-head casting K having a water-chamber $K'$ adapted to come immediately over the heads of the cylinders and to communicate with the water-jacket surrounding the cylinders, said casting having formed in it also two lateral chambers $K^2\ K^2$ and a central chamber $K^3$, valve-ports $K^4$ and $K^5$ leading from said chambers through the water-chamber $K'$ and through the cylinder-heads as described, and igniter-tubes $K^7$ passing through the entire head-casting.

9. In a gas-engine a chamber N, in combination with valve-actuating cams and connections situated in said chamber, a pump having its suction-port situated at the bottom of chamber N and its delivery-conduits provided with nozzles adapted to throw oil over the bearings and contacting surfaces of the mechanism in the chamber, a pump-plunger actuated by the cam-shaft in said chamber.

GEORGE S. STRONG.

Witnesses:
CHAS. F. MYERS,
D. STEWART.